United States Patent [19]

Kishitani et al.

[11] 4,073,152
[45] Feb. 14, 1978

[54] SYSTEM FOR LAYING A SUBTERRANEAN WATER IMPERVIOUS ASPHALT LAYER

[75] Inventors: Masatoshi Kishitani, Takatsuki; Yoshiteru Tamagaki, Hirakata; Takeji Matsumoto, Hirakata; Mikio Sugimoto, Hirakata; Noriaki Namiki, Neyagawa, all of Japan

[73] Assignee: Kabushiki Kaisha Komatsu Seisakusho, Tokyo, Japan

[21] Appl. No.: 580,353

[22] Filed: May 23, 1975

[30] Foreign Application Priority Data

May 25, 1974 Japan .............................. 49-59336[U]
May 27, 1974 Japan .............................. 49-59699[U]
May 30, 1974 Japan ................................. 49-60259

[51] Int. Cl.² .................... E02B 5/02; A01C 23/02
[52] U.S. Cl. ....................................... 61/63; 61/1 R; 61/13; 404/111
[58] Field of Search ................. 61/1, 63, 72.6, 13, 61/72.1; 404/111; 222/146 H, 148

[56] References Cited

U.S. PATENT DOCUMENTS

| | | | |
|---|---|---|---|
| 1,546,185 | 7/1925 | Andresen | 404/111 X |
| 3,036,741 | 5/1962 | Hilts | 222/148 |
| 3,405,529 | 10/1968 | Hansen et al. | 61/1 |
| 3,647,096 | 3/1972 | Holland | 404/111 X |

*Primary Examiner*—Jacob Shapiro
*Attorney, Agent, or Firm*—Armstrong, Nikaido & Marmelstein

[57] ABSTRACT

A system for laying a subterranean water impervious asphalt layer which is mounted on a tractor and includes a liquidized asphalt supply tank and a subterranean plough provided with a plurality of outlet ports so that liquidized asphalt is fed from the tank through a liquidized ashalt supply pipe connecting the tank to the ports by a liquidized asphalt supply pump provided in the pipe and driven by a hydraulic motor so that liquidized asphalt is discharged by the ports to form a water impervious asphalt layer into a subterranean cavity. The system is provided with a hydraulic pump driven by an engine of the tractor and connected to the hydraulic motor and a switching valve provided in the lines connecting the hydraulic pump to the hydraulic motor so that the hydraulic motor is driven in the forward or reverse direction as well as is held standstill by the actuation of the switching valve. The system is provided with a washing tank containing cleaning liquid therein, and the tank is switchingly connected to the tank through a two-way switching valve so that the pipe and the ports can be cleaned by the cleaning liquid by operating the two-way switching valve. The system further comprises a burner for heating asphalt in the tank which is supplied with fuel from the fuel tank of the engine through a fuel supply pipe by the actuation of a cock provided in the fuel supply pipe.

7 Claims, 14 Drawing Figures

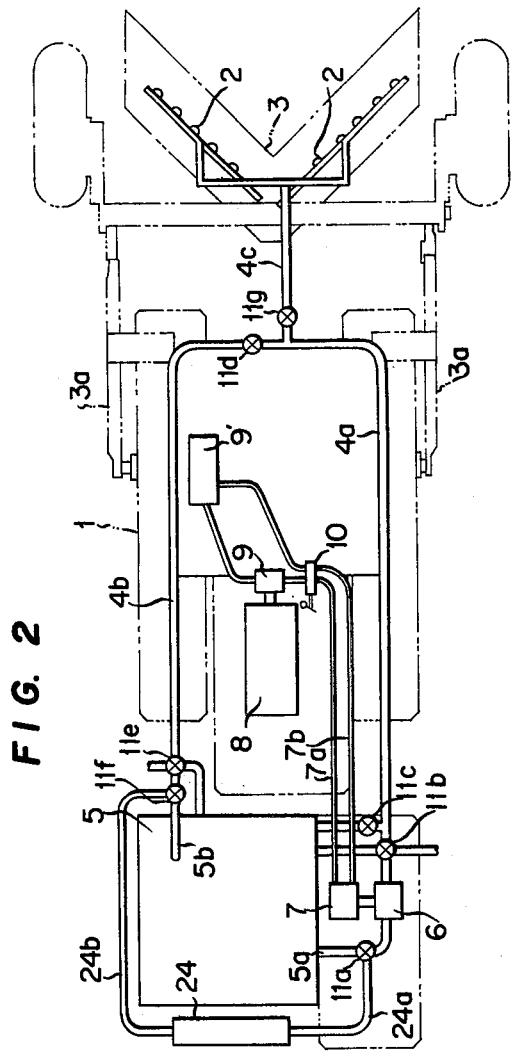
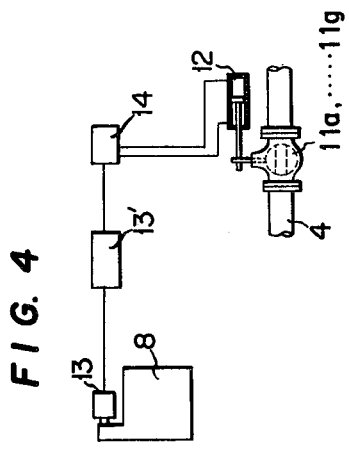
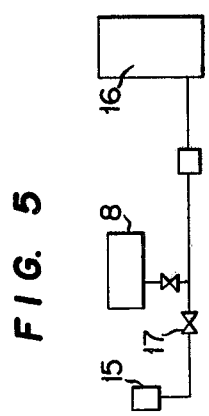
FIG. 2
FIG. 4
FIG. 5

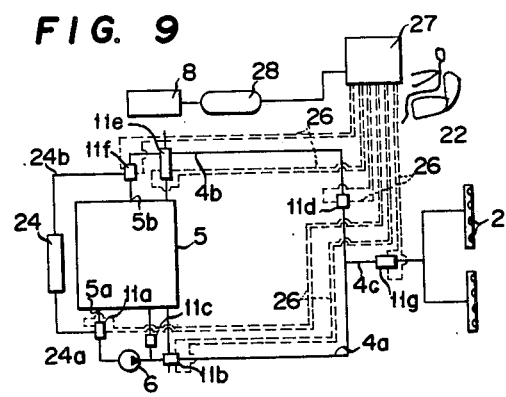

SYSTEM FOR LAYING A SUBTERRANEAN WATER IMPERVIOUS ASPHALT LAYER

BACKGROUND OF THE INVENTION

1. Field of the Invention

The present invention relates to system for laying a subterranean water impervious asphalt layer which is mounted on a tractor and includes a liquidized asphalt supply tank, a liquidized asphalt supply pipe and outlet ports for discharging liquidized asphalt, and more particularly, to a system for strewing liquidized asphalt by the tractor referred to the above as well as for removing liquidized asphalt from the liquidized asphalt supply pipe and the outlet ports after the operation of the tractor.

2. Description of the Prior Art

A system for laying a subterranean water impervious asphalt layer has been recently developed, for example, as shown in U.S. Pat. No. 3,276,208 in order to render a tract of barren land such as a desert to be useful as a farming area or a tree planting area. The subterranean water impervious asphalt layer serves to prevent water on the surface of the earth from permeating into the depth of earth as well as to prevent water containing much salt from rising to the surface of the earth.

Prior art system for laying the subterranean water impervious asphalt layer suffers from difficulties such as inconvenience in controlling various valve means for properly operating the tank and troubles in sticking asphalt in the piping and the outlet ports in the tractor after the operation of the tractor is terminated which makes it very troublesome to quickly commence the next operation of the tractor.

The present invention aims at avoiding the difficulties occurring in the prior art system for laying a subterranean water impervious asphalt layer as referred to the above.

SUMMARY OF THE INVENTION

The object of the present invention is to provide a novel and useful system for laying a subterranean water impervious layer which avoids the above described difficulties occurring in the prior art tractor as described above.

Above object is achieved in accordance with one of the characteristic features of the present invention by providing a system for laying a subterranean water impervious asphalt layer which is mounted on a tractor and includes an engine of the tractor, a liquidized asphalt supply tank, a subterranean plough mounted on the rear side of the tractor body and provided with a plurality of outlet ports therein, a liquidized asphalt supply pipe connected between the liquidized asphalt supply tank and the outlet ports, a liquidized asphalt supply pump provided in the liquidized asphalt supply pipe and a hydraulic motor connected to the liquidized asphalt supply pump for driving the same when the hydraulic motor is energized so as to pump liquidized asphalt from the liquidized asphalt supply tank through the liquidized asphalt supply pipe to the liquidized asphalt outlet ports causing liquidized asphalt to be discharged through the outlet ports during the movement of the tractor, thereby permittng a water impervious asphalt layer to be formed into a subterranean cavity, the system being characterized by a hydraulic pump driven by the engine of the tractor and connected to the hydraulic motor through hydraulic lines for energizing the same and a switching valve provided in the hydraulic lines thereby permitting the hydraulic motor to be driven in the forward or reverse direction as well as to be held in standstill position together with the liquidized asphalt supply pump by the actuation of the switching valve.

With the arrangement as described above, liquidized asphalt tending to stick in the piping and the liquidized asphalt supply tank can be effectively removed and returned to the tank to facilitate the next operation of the tractor.

In accordance with another feature of the present invention there is provided a system of the type as described in the above which has a fuel tank for feeding fuel to a main engine of the tractor, a liquidized asphalt supply tank and a subterranean plough mounted on the rear side of the tractor body and provided therein with a plurality of outlet ports, the outlet ports being connected to the liquidized asphalt supply tank so as to permit liquidized asphalt to be fed from the tank through the outlet ports during the movement of the tractor, thereby permitting a water impervious asphalt layer to be formed into a subterranean cavity, the system being characterized by a burner located adjacent to the liquidized asphalt supply tank for heating asphalt therein, a fuel supply pipe connecting the burner to the fuel tank and a cock provided in the fuel supply pipe, thereby permitting fuel in the fuel tank to be fed to the burner by the actuation of the cock so as to heat asphalt in the liquidized asphalt supply tank by the burning of fuel at the burner.

With the arrangement as described above, the burner can be conveniently supplied with fuel from the fuel tank of the engine for heating asphalt in the tank appropriately preparatory to the proper operation of the tractor.

In accordance with a further feature of the present invention, there is provided a system of the type as described in the above which includes an engine of the tractor, a liquidized asphalt supply tank, a subterranean plough mounted on the rear side of the tractor body and provided therein with a plurality of outlet ports for discharging liquidized asphalt, a liquidized asphalt supply pipe connected between the liquidized asphalt supply tank and the outlet ports and a liquidized asphalt supply pump provided in the liquidized asphalt supply pipe for pumping out liquidized asphalt from the liquidized asphalt supply tank through the liquidized asphalt supply pipe to the outlet ports causing liquidized asphalt to be discharged through the outlet ports during the movement of the tractor, thereby permitting a water impervious asphalt layer to be formed into a subterranean cavity, the system being characterized by a washing tank containing cleaning liquid therein, a cleaning liquid supply pipe having one end connected to the washing tank, a two-way switching valve provided in the liquidized asphalt supply pipe at the input side of the liquidized asphalt supply pump with one of the inlet sides thereof connected to the liquidized asphalt supply tank while the outlet side is connected to the liquidized asphalt supply pump, the other end of the cleaning liquid supply pipe being connected to the other of the inlet sides of the two-way switching valve, thereby permitting the cleaning liquid to be fed through the liquidized asphalt supply pipe to the outlet ports by the liquidized asphalt supply pump upon actuation of the two-way switching valve.

With the above arrangement, the cleaning of the liquidized asphalt supply tank and the liquidized asphalt supply pipe as well as the outlet ports can be conveniently cleaned by one and the same liquidized asphalt supply pump by merely switching the two-way switching valve.

Other objects and advantages of the present invention will be apparent from the following description when read in connection with the accompanying drawings.

BRIEF DESCRIPTION OF THE DRAWINGS

FIG. 2 is a schematic plan view showing the general arrangement of the liquidized asphalt supply system as well as the cleaning liquid supply system of the present invention incorporated in the system shown in FIG. 1;

FIG. 4 is a circuit diagram showing the pneumatic cylinder energized by the compressor driven by the engine for actuating the respective valve in the liquidized asphalt supply pipe;

FIG. 5 is a circuit diagram showing the fuel supply system of the burner;

FIG. 9 is a circuit diagram showing another embodiment of the present invention for controlling the switching of the various valves in the liquidized asphalt and cleaning liquid supply system;

FIG. 10 is a fragmentary view showing the two-way switching valve in the liquidized asphalt and cleaning liquid supply systems operated by pneumatic cylinder;

FIG. 11 is a fragmentary view showing the shut-off valve in the liquidized asphalt and cleaning liquid supply systems operated by pneumatic cylinder;

FIG. 12 is a circuit diagram showing a still further embodiment of the present invention for controlling the switching of the various valves in the liquidized asphalt and the cleaning liquid supply systems;

FIG. 13 is a circuit diagram showing the electromagnetic switching valve for actuating pneumatic cylinder so as to control the shut-off valve; and FIG. 14 is a schematic circuit diagram showing a still further embodiment of the liquidized asphalt and cleaning liquid supply systems of the present invention.

DETAILED DESCRIPTION OF THE PREFERRED EMBODIMENTS

Figure 1:
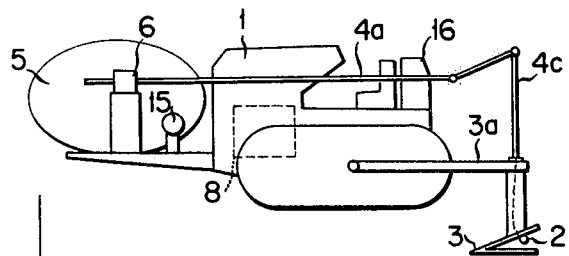
FIG. 1 is a schematic general side view showing the system mounted on a tractor embodying the present invention.

Referring to FIG. 1, there is shown a tractor 1 embodying the present invention. A subterranean plough 3 having a plurality of outlet ports 2 is vertically swingably mounted on the rear side of the tractor 1 by supporting rods 3a connecting the plough 3 to the tractor 1. A liquidized asphalt supply tank 5 is mounted on the tractor 1 at the forward end thereof. One end of a liquidized asphalt supply pipe 4a is connected to the outlet opening 5a of the tank 5, and the other end of the liquidized asphalt supply pipe 4a is connected to shut-off valves 11d and 11g. The valve 11d is connected to one end of a liquidized asphalt return pipe 4b, the other end of which is connected to the inlet opening 5b of the tank 5. The valve 11g is connected to the outlet ports 2 through a pipe 4c which is deformable or bendable so as to follow the swinging movement of the plough 3 housing therein the outlet ports 2.

A two-way switching valve 11a is provided in the liquidized asphalt supply pipe 4a adjacent to the outlet opening 5a of the tank 5. One of the inlet side of the valve 11a is connected to the outlet opening 5a while the outlet side thereof is connected to a liquidized asphalt supply pump 6 provided in the pipe 4a as shown in FIG. 2 so as to pump out liquidized asphalt in the tank through the pipes 4a and 4c to the outlet ports 2 or to return liquidized asphalt through the pipe 4a and the return pipe 4b to the tank 5 depending upon the actuation of the valves 11d, 11g. A switching valve 11b is provided in the pipe 4a between the pump 6 and the valve 11d adjacent to the tank 5 so that, upon actuation of the valve 11b, asphalt in the pipe 4a is fed to the valves 11d, 11g or returned to the tank 5 or discharged to the exterior of the tractor 1. A safety valve 11c is provided between the tank 5 and the pipe 4a.

A switching valve 11e similar in operation to the valve 11b is provided in the return pipe 4b adjacent to the inlet opening 5b of the tank 5 which serves to return liquidized asphalt in the pipe 4b to the tank 5 or to discharge the same exterior of the tractor 1.

A two-way switching valve 11f is provided in the pipe 4b between the valve 11e and the inlet opening 5b of the tank 5 with the inlet side thereof connected to the valve 11e while one of the outlet side is connected to the inlet opening 5b of the tank 5.

A washing tank 24 containing therein cleaning liquid such as light oil, lamp oil and heavy oil which can be mixed with liquidized asphalt to dilute the same is provided adjacent to the liquidized asphalt supply tank 5 and one end of a pipe 24a is connected to the outlet opening of the tank 24 while the other end is connected to the other of the inlet sides of the two-way switching valve 11a previously described. Similarly, one end of a pipe 24b is connected to the inlet opening of the washing tank 24 while the other end is connected to the other of the outlet sides of the two-way switching valve 11f referred to the above.

Thus, the tank 24 is connected in place of the tank 5 to the pipe 4a and the pipe 4b by appropriately actuating the valves 11a and 11f.

The liquidized asphalt supply pump 6 is coupled with a hydraulic motor 7 so as to be driven thereby. The hydraulic motor 7 is in turn connected to a hydraulic pump 9 driven by the engine 8 of the tractor 1 through lines 7a, 7b in which an accumulator 9' and a switching valve 10 are provided so that the hydraulic pump 9 generates pressurized working fluid such as hydraulic oil in the lines 7a, 7b for driving the hydraulic motor 7, thereby permitting the pump 6 to feed liquidized asphalt or cleaning liquid through the pipe 4a depending upon the actuation of the valves 11a, 11f.

As shown in FIGS. 1 and 15, a burner 15 for heating asphalt in the tank 5 is provided adjacent to the liquidized asphalt supply tank 5. The burner 15 is connected to a fuel tank 16 of the engine 8 through a line in which a shut-off valve 17 is provided so that fuel from the fuel tank 16 can be supplied to the burner 15 by operating the valve 17.

Figure 6:
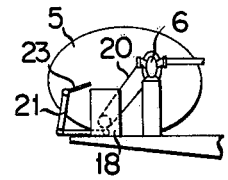
FIG. 6 is a schematic front view showing the alternative form of the driving system of the liquidized asphalt supply pump.
Figure 7:
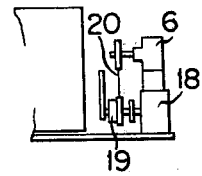
FIG. 7 is a side view of FIG. 6.
Figure 8:
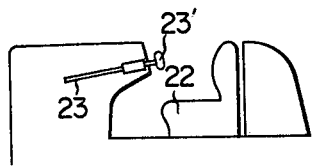
FIG. 8 is a schematic side view showing the control system for the driving system of FIG. 6.

FIGS. 6 – 8 show an alternative form of the driving system of the liquidized asphalt supply pump 6.

In these figures, an auxiliary engine 18 is mounted on the forward portion of the tractor 1. The output of the engine 18 is transmitted to the pump 6 through a clutch 19 and V-belt(s) 20 interconnecting pulleys of the pump 6 and the clutch 19. The control of the pump 6 is effected by control knob 23' located at the operator's seat 22 which is connected to a switching lever 21 of the engine 18 through a push-pull wire 23. The clutch 19 may be in the form of an electromagnetic clutch.

The control of each of the various valves in the circuit described above can be effected by a pneumatic cylinder 12 coupled with the respective valve as shown in FIG. 4 which is energized by an air compressor 13 through an accumulator 13' and a control valve 14, the compressor 13 being driven by the engine 8.

In general operations when the tractor 1 is to be operated to lay a subterranean water impervious asphalt layer, the valves 11a and 11f are first switched so that they connect the liquidized asphalt supply tank 5 to the pipe 4a and the pipe 4b instead of the washing tank 24, and the valve 11d is opened while the valve 11g is closed. The valves 11b and 11e are so positioned that they establish the passage from the pump 6 through the pipes 4a and 4b to the valve 11f.

Then the engine 8 is operated. Thereafter, asphalt is introduced into the liquidized asphalt supply tank 5 and the burner 15 is ignited so as to heat asphalt in the tank 5 and the liquidized asphalt supply pump 6 is driven by energizing the hydraulic motor 7 through the hydraulic pump 9 driven by the engine 8 so as to circulate liquidized asphalt from the tank 5 through pipes 4a, 4b to the tank 5.

After the various parts of the tractor 1 circulating liquidized asphalt are heated to a temperature appropriate for the operation of the tractor 1, the burner 15 is stopped so as to be ready for operation.

Then, the plough 3 is brought into the appropriate depth of the earth while the tractor 1 is running and the valve 11d is closed while the valve 11g is opened. Thus, liquidized asphalt is supplied to the outlet ports 2 by the actuation of the pump 6 so that liquidized asphalt is discharged through the outlet ports 2, thereby permitting a subterranean water impervious asphalt layer to be formed as the tractor 1 is running.

After the desired length of the asphalt layer is formed or when the tractor 1 is to be stopped, the valve 11g is closed while the valve 11d is opened so as to permit liquidized asphalt to circulate from the tank 5 through pipes 4a, 4b to the tank 5.

Then, the pump 6 is stopped and the valves 11b and 11e are switched so as to return liquidized asphalt remaining in the pipes 4a, 4b into the tank 5 or to discharge the same out of the tractor 1. To this end, the valves 11b and 11e are positioned at the lowest portions of the pipes 4a, 4b so as to permit liquidized asphalt in the pipes 4a and 4b to be returned to the tank 5 or to be discharged by the gravity.

In order to clean the pump 6, the pipes 4a, 4b and the outlet ports 2, the valves 11a, 11f are switched so as to connect the washing tank 24 to the pipes 4a, 4b, respectively, while the valves 11b, 11e are switched so as to communicate the pump 6 with the valve f.

For cleaning the pump 6 and the pipes 4a, 4b, the valve 11g is closed while the valve 11d is opened and the pump 6 is actuated. Then, the cleaning liquid is circulated from the tank 24 through the pipe 24a, the pump 6, the pipes 4a, 4b and the pipe 24b to the tank 24, thereby permitting the parts through which the cleaning liquid is passed to be cleaned.

In order to clean the outlet ports 2, the valve 11g is opened while the valve 11d is closed. Then, the cleaning liquid is fed to the outlet ports 2 so that the ports 2 are cleaned.

In order to investigate the conditions of the liquidized asphalt in the tank 5 and cleaning liquid in the tank 24, the liquidized asphalt or cleaning liquid is extracted by partially opening the valves 11b and 11e so as to enable the inspection of the liquidized asphalt or cleaning liquid to be performed.

Figure 3:
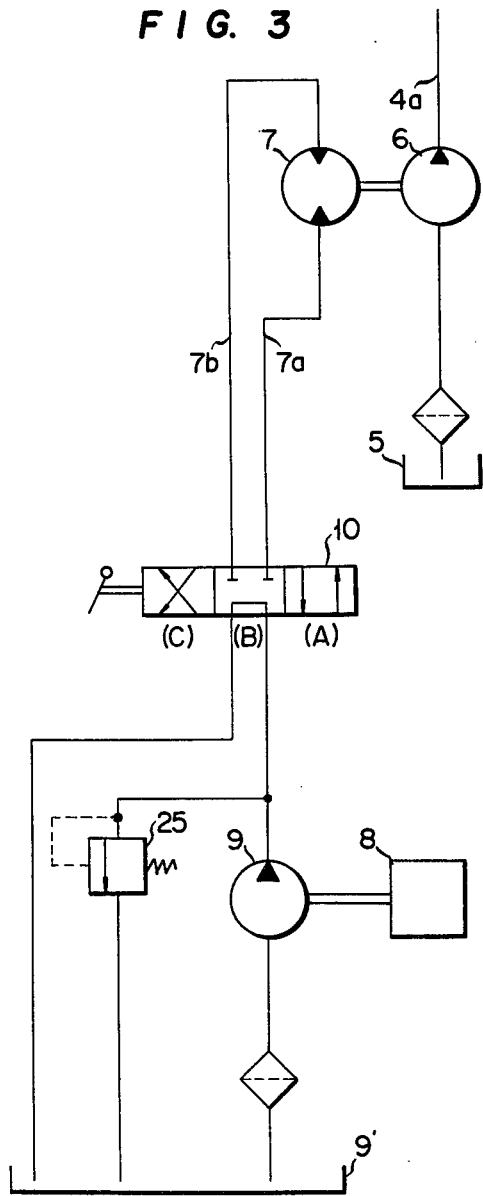
FIG. 3 is a fragmentary circuit diagram showing the connection of the switching valve to the hydraulic motor and the hydraulic pump driven by the engine capable of reversing the operation of the liquidized asphalt supply pump.

In accordance with a characteristic feature of the present invention, the switching valve 10 provided in the lines 7a, 7b is so constructed that it permits the hydraulic motor 7 coupled with the liquidized asphalt supply pump 6 to be driven in the reverse direction or to be held standstill by the switching of the valve 10 as shown in FIG. 3.

As shown in FIG. 3, the valve 10 has three positions, i.e. the forward position "A," the neutral position "B" and the reverse position "C." A relief valve 25 is provided in parallel to the hydraulic pump 9 as shown.

Thus, when the valve 10 is switched to the position "A," the operation of the tractor 1 is effected as described previously in which the motor 7 and, hence, the pump 6 is driven in the normal or forward direction.

When the valve 10 is switched to the position "B," the motor 7 is stopped together with the pump 6 regardless of the continuous running of the hydraulic pump 9.

When the valve 10 is switched to the position "C," then the motor 7 is driven in the reverse direction together with the pump 7, thereby permitting liquidized asphalt existing in the liquidized asphalt supply pipe 4a which tends to stick therein to be positively returned to the tank 5 and removed from the pipe 4a without requiring the cleaning liquid to be fed through the pipe 4a.

This is particularly effective when the tractor 1 is temporarily stopped in order to remove liquidized asphalt tending to stick to the pipe 4a but it is required to be operated again quickly without introducing cleaning liquid for cleaning the pipe 4a.

FIGS. 9 – 13 show another embodiment of the present invention in which the various valves in liquidized asphalt and cleaning liquid supply systems are actuated by the respective pneumatic cylinders which are controlled by control valves arranged in a control board located adjacent to the operator's seat of the tractor so that the manipulation thereof is greatly facilitated.

The arrangement shown in FIG. 9 is substantially similar to that shown in FIG. 2.

In accordance with the another feature of the present invention, each of the two-way switching valves such as valves 11a, 11f is actuated by a pneumatic cylinder 30 connected thereto as shown in FIG. 10. The cylinder 30 has pressure chambers 30a, 30b and a piston is slidably arranged in the cylinder 30 between the chambers 30a, 30b and the piston rod thereof is connected to the valve.

An air compressor 28 driven by the engine 8, for example, is connected to the respective set of lines 26 leading to the respective cylinder 30 connected to each of the valves which is to be actuated by the compressor 28 through a control valve (not shown) located in a control board 27 located adjacent to the operator's seat 22.

Thus, by controlling the control valve of each of the cylinders 30 by the operator seating in the seat 22, the valves can be conveniently actuated to the desired position for the proper operation of the tractor 1.

In the similar way, the shut-off valves such as 11d, 11g can be controlled by the pneumatic cylinders 31 connected thereto. The cylinders 31 are also connected through sets of lines 26 to the compressor 28 through control valves located in the control board 27 as shown in FIGS. 9 and 11.

FIG. 13 shows an alternative form of the control system of the various valves. In this arrangement, an electromagnetic valve 32 energized or deenergized by the operation of a manipulating switch 33 is provided in the lines 26 leading to each of the valves desired to be controlled thereby. Thus, by energizing or deenergizing the electromagnetic valve 32, each of the valves can be actuated to control the valve.

FIG. 12 shows an alternative form of the control system of the valves of FIG. 9. In FIG. 12, an oil pump 29 is driven by the engine 8 instead of the air compressor 28 in FIG. 9 and the hydraulic oil from the pump 29 is fed to the control valves in the control board 27 so that each of the valves in the pipes 4a, 4b, 4c is controlled by the respective control valve in the control board 27.

With the above construction, the operator can conveniently control the various valves while he is sitting in the operator's seat 22, thereby improving the working efficiency of the tractor 1.

FIG. 14 shows a further alternative form of the present invention. In FIG. 14, liquidized asphalt and the cleaning liquid circulating system are substantially similar to that shown in FIG. 2 except that a two-way switching valve 34 is provided in the pipe 4a between the pump 6 and the valve 11b with the inlet side thereof connected to the pump 6 while one of the outlet sides is connected to the valve 11b, and a two-way switching valve 36 is provided in the pipe 4c between the valve 35 provided in the pipe 4a in place of the valves 11d, 11g in FIG. 2 and the outlet ports 2 with one of the inlet sides thereof connected to the valve 35 while the outlet side is connected to the outlet ports 2.

In accordance with the present invention, one end of an auxiliary pipe 37 is connected to the other of the outlet sides of the valve 37 and the other end is connected to the other of the inlet sides of the valve 36.

With this arrangement, in the cleaning operation, cleaning liquid can be directly supplied to the outlet ports 2 from the pump 6 through the pipe 37 without passing through the substantial length of the pipe 4a by appropriately operating the valves 34, 36.

This permits the operation of the tractor 1 to by very efficient, particularly in case the tractor 1 is temporarily stopped for the repair for minor accident and only the outlet ports 2 are cleaned for preventing the sticking of asphalt therein but asphalt is maintained in the pipe 4a so as to permit the operation of the tractor 1 to be quickly commenced after the repair.

We claim:

1. In a system for strewing liquidized asphalt mounted on a tractor to lay a subterranean water impervious asphalt layer which includes an engine of the tractor, a liquidized asphalt supply tank, a subterranean plough mounted on the rear side of the tractor body and provided therein with a plurality of outlet ports for discharging liquidized asphalt, a liquidized asphalt supply pipe connected between the liquidized asphalt supply tank and the outlet ports, a liquidized asphalt supply pump provided in the liquidized asphalt supply pipe and a hydraulic motor connected to the liquidized asphalt supply pump for driving the same when the hydraulic motor is energized so as to pump out liquidized asphalt from the liquidized asphalt supply tank through the liquidized asphalt supply pipe to the outlet ports causing liquidized asphalt to be discharged through the outlet ports during the movement of the tractor, thereby permitting a water impervious asphalt layer to be formed into a subterranean cavity, the improvement comprising a hydraulic pump driven by the main engine of the tractor and connected to the hydraulic motor through hydraulic lines for energizing the same and a switching valve provided in the hydraulic lines, thereby permitting the hydraulic motor to be driven in the forward or reverse direction as well as to be held in standstill position together with the liquidized asphalt supply pump by the actuation of the switching valve.

2. In a system for strewing liquidized asphalt mounted on a tractor to lay a subterranean water impervious asphalt layer which includes an engine of the tractor, a liquidized asphalt supply tank, a subterranean plough mounted on the rear side of the tractor body and provided therein with a plurality of outlet ports for discharging liquidized asphalt, a liquidized asphalt supply pipe connected between the liquidized asphalt supply tank and the outlet ports and a liquidized asphalt supply pump provided in the liquidized asphalt supply pipe for pumping out liquidized asphalt from the liquidized asphalt supply tank through the liquidized asphalt supply pipe to the outlet ports causing liquidized asphalt to be discharged through the outlet ports during the movement of the tractor, thereby permitting a water impervious asphalt layer to be formed into a subterranean cavity, the improvement comprising a washing tank containing cleaning liquid therein, a cleaning liquid supply pipe having one end connected to the washing tank, a two-way switching valve provided in the liquidized asphalt supply pipe at the input side of the liquidized asphalt supply pump with one of the inlet sides thereof connected to the liquidized asphalt supply tank while the outlet side is connected to the liquidized asphalt supply pump, the other end of the cleaning liquid supply pipe being connected to the other of the inlet sides of the two-way switching valve thereby permitting the cleaning liquid to be fed through the liquidized asphalt supply pipe to the outlet ports by the liquidized asphalt supply pump upon actuation of the two-way switching valve.

3. A system according to claim 2, further comprising a hydraulic cylinder connected to the two-way switching valve, a compressor connected to the engine of the tractor so as to generate pressurized working fluid, the compressor being connected to the hydraulic cylinder through lines provided therein with a control valve, thereby permitting the two-way switching valve to be actuated by the actuation of the control valve.

4. A system according to claim 2, further comprising a second two-way switching valve provided in the liquidized asphalt supply pipe at the output side of the liquidized asphalt supply pump adjacent thereto with the inlet side thereof connected to the output side of the liquidized asphalt supply pump while one of the outlet sides of the second two-way switching valve is connected to the liquidized asphalt supply pipe leading to the outlet ports, a third two-way switching valve provided in the liquidized asphalt supply pipe adjacent to the outlet ports with the outlet side thereof connected to the outlet ports while one of the inlet sides of the third two-way switching valve is connected to the liquidized asphalt supply pipe leading to the second two-way switching valve, and a cleaning liquid feeding pipe having one end connected to the other of the outlet sides of the second two-way switching valve while the other end is connected to the other of the inlet sides of the third two-way switching valve, thereby permitting the cleaning liquid to be supplied from the washing tank directly to the outlet ports without passing through the substantial length of the liquidized asphalt supply pipe by the actuation of the second and the third two-way switching valve in connection with the actuation of the first mentioned two-way switching valve provided in the liquidized asphalt supply pipe at the input side of the liquidized asphalt supply pump.

5. A system according to claim 4, further comprising hydraulic cylinders, each being connected to the respective two-way switching valve, a compressor connected to the engine of the track so as to generate pressurized working fluid, the compressor being connected to the respective hydraulic cylinders through lines provided therein with control valves, respectively, thereby permitting each of the two-way switching valves to be actuated by the actuation of the respective control valves.

6. A system according to claim 5, further comprising a control board located adjacent to the operator's seat of the tractor, the control valves being arranged in the control board thereby permitting the respective hydraulic cylinders to be controlled by the control valves at the control board.

7. In a system for strewing liquidized asphalt mounted on a tractor to lay a subterranean water impervious asphalt layer which includes an engine of the tractor, a liquidized asphalt supply tank, a subterranean plough mounted on the rear side of the tractor body and provided therein with a plurality of outlet ports for discharging liquidized asphalt, a liquidized asphalt supply pipe connected between the liquidized asphalt supply tank and the outlet ports, a liquidized asphalt supply pump provided in the liquidized asphalt supply pipe and a hydraulic motor connected to the liquidized asphalt supply pump for driving the same when the hydraulic motor is energized so as to pump out liquidized asphalt from the liquidized asphalt supply tank through the liquidized asphalt supply pipe to the outlet ports causing liquidized asphalt to be discharged through the outlet ports during the movement of the tractor, thereby permitting a water impervious asphalt layer to be formed into a subterranean cavity, the improvement comprising a hydraulic pump driven by the main engine of the tractor and connected to the hydraulic motor through the hydraulic lines for energizing the same and a switching valve provided in the hydraulic lines, thereby permitting the hydraulic motor to be driven in the forward or reverse direction as well as to be held in a standstill position together with the liquidized asphalt supply pump by the actuation of the switching valve and a burner located adjacent to the liquidized asphalt supply tank for heating asphalt therein, a fuel supply pipe connecting the burner to the fuel tank and a cock provided in the fuel supply pipe, thereby permitting fuel in the fuel tank to be fed to the burner by the actuation of the cock so as to heat asphalt in the liquidized asphalt supply tank by the burning of fuel at the burner.

* * * * *